United States Patent [19]
Allen

[11] Patent Number: 5,439,597
[45] Date of Patent: Aug. 8, 1995

[54] METHOD FOR REMOVING CHEMICAL CONTAMINANTS FROM MATERIAL AND APPARATUS FOR SAME

[75] Inventor: Peter A. Allen, Calistoga, Calif.

[73] Assignee: Unique Products, Inc., San Mateo, Calif.

[21] Appl. No.: 76,351

[22] Filed: Jun. 11, 1993

[51] Int. Cl.⁶ .......................................... B01D 67/00
[52] U.S. Cl. .................................. 210/767; 210/776; 210/799; 210/781; 210/800; 210/242.1; 210/242.3; 210/DIG. 5; 210/195.1; 210/257.1; 210/521; 134/25.1; 134/65
[58] Field of Search ............... 210/767, 768, 776, 799, 210/195.1, 781, 242.3, DIG. 5, 521, 522, 122, 126, 800, 242.1, 257.1; 134/25.1, 40, 65, 131

[56] References Cited

U.S. PATENT DOCUMENTS

| | | | |
|---|---|---|---|
| 4,400,274 | 8/1983 | Protos | 210/521 |
| 4,836,302 | 6/1989 | Heilhecker et al. | 134/40 |
| 5,015,393 | 5/1991 | Russell et al. | 210/776 |
| 5,047,149 | 10/1991 | Vion | 210/521 |
| 5,080,721 | 1/1992 | Flanigan et al. | 134/40 |
| 5,160,605 | 11/1992 | Noestheden | 210/122 |
| 5,199,997 | 4/1993 | Stowe | 134/25.1 |
| 5,252,138 | 10/1993 | Guymon | 134/40 |

OTHER PUBLICATIONS

Unique Products, Inc., "Oil Contamination Cleanup", Jan. 30, 1992.

*Primary Examiner*—Robert A. Dawson
*Assistant Examiner*—Ana M. Fortuna
*Attorney, Agent, or Firm*—Flehr, Hohbach, Test, Albritton & Herbert

[57] ABSTRACT

A method for removing petroleum contaminants from larger-size and smaller-size petroleum-bearing earth-like materials using a movable apparatus. The method includes the steps of loading larger-size and smaller-size petroleum-bearing earth-like materials onto the movable apparatus, screening larger-size petroleum-bearing earth-like material from smaller-size petroleum-bearing earth-like material, spraying larger-size petroleum-bearing earth-like materials with an aqueous cleansing solution having a biodegradable emulsifier therein to remove petroleum contaminants therefrom and to substantially cleanse the larger-size earth-like material and discharging substantially cleansed larger-size earth-like material from the movable apparatus, mixing an aqueous cleansing solution having a biodegradable emulsifier therein with smaller-size petroleum-bearing earth-like material to form a slurry, agitating the slurry, washing smaller-size petroleum-bearing earth-like material remaining in the slurry to remove petroleum contaminants therefrom and to substantially cleanse said smaller-size earth-like material, removing substantially cleansed smaller-size earth-like material from aqueous cleansing solution and petroleum contaminants in the slurry, dewatering substantially cleansed smaller-size earth-like material, discharging substantially cleansed smaller-size earth-like material from the movable apparatus, removing petroleum contaminants from aqueous cleansing solution and discharging petroleum contaminants from the movable apparatus.

15 Claims, 7 Drawing Sheets

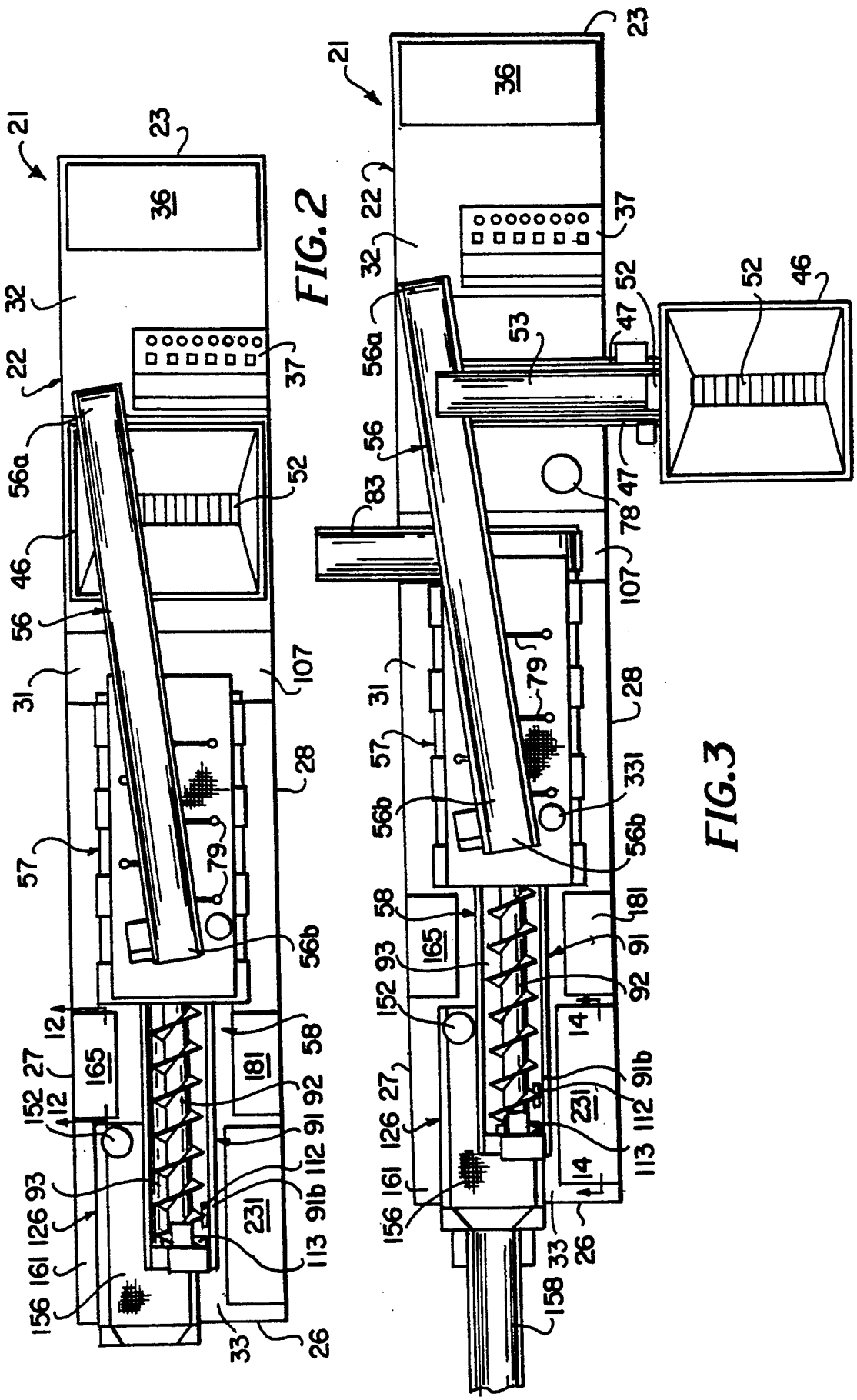

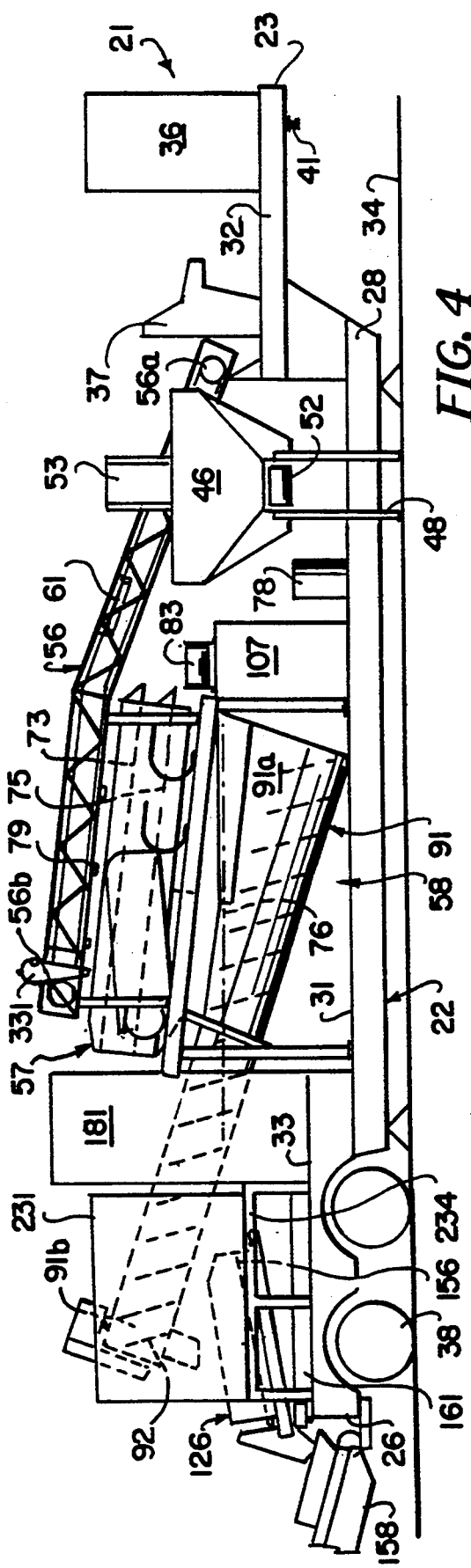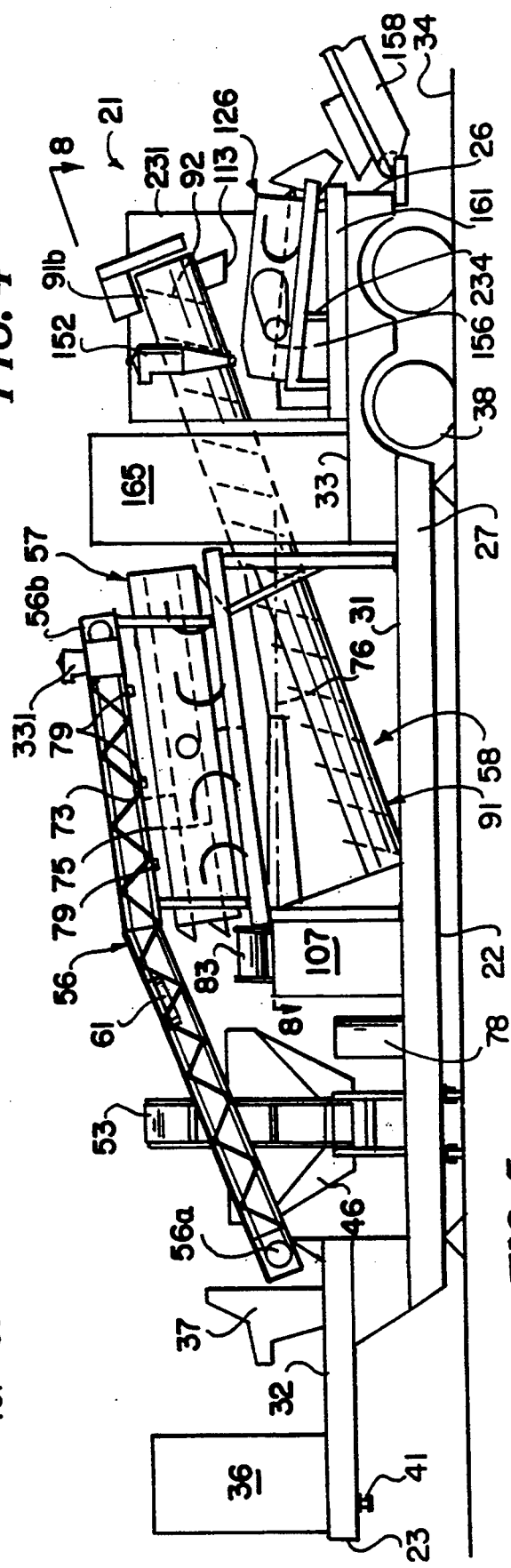

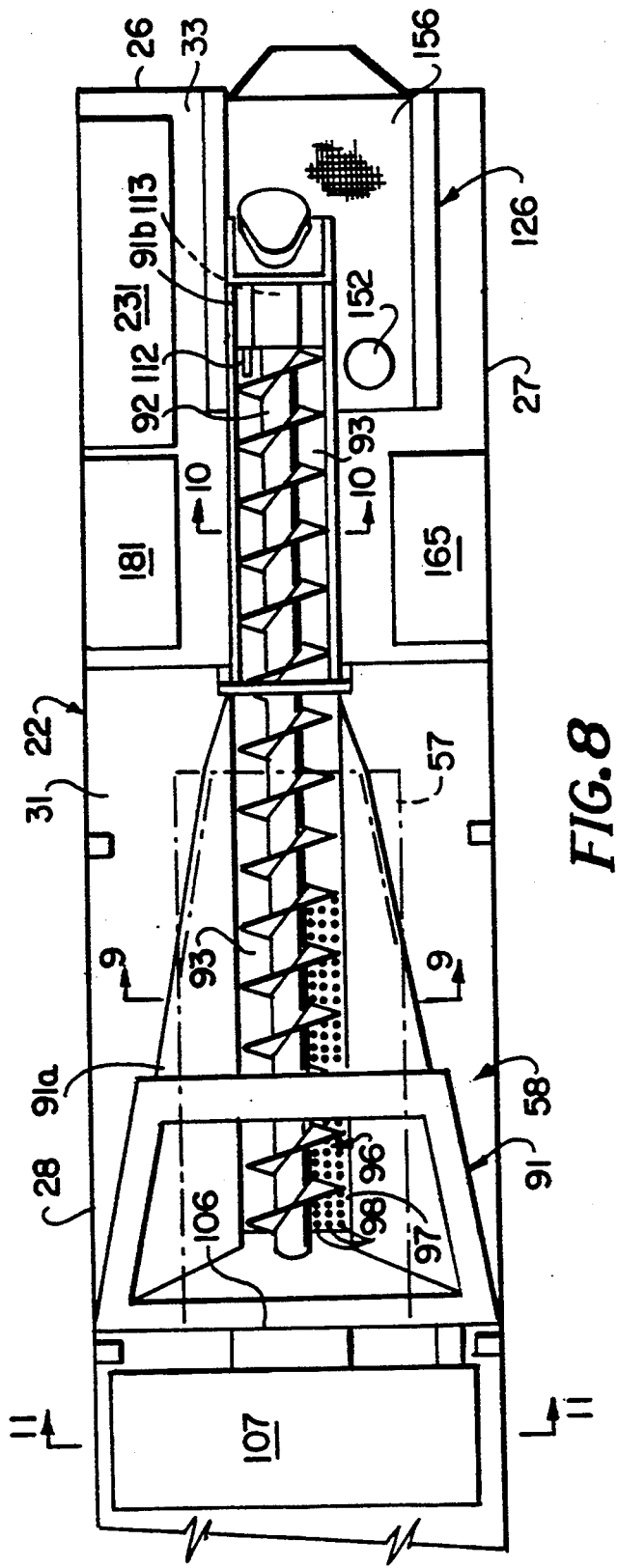
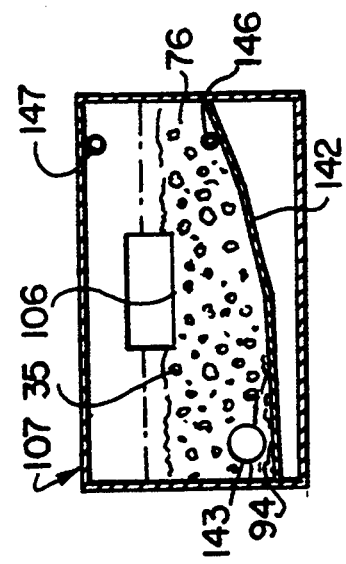
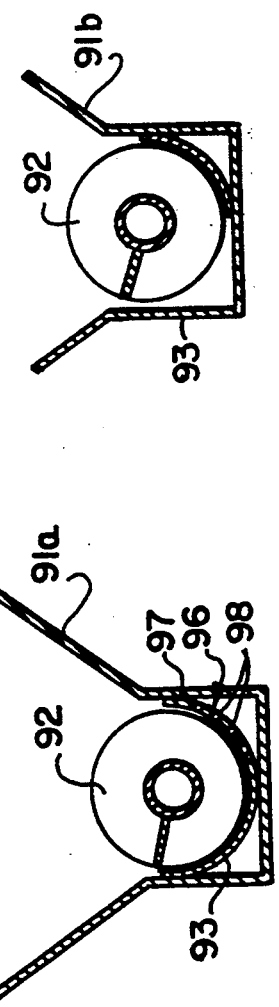
FIG. 8
FIG. 11
FIG. 10
FIG. 9

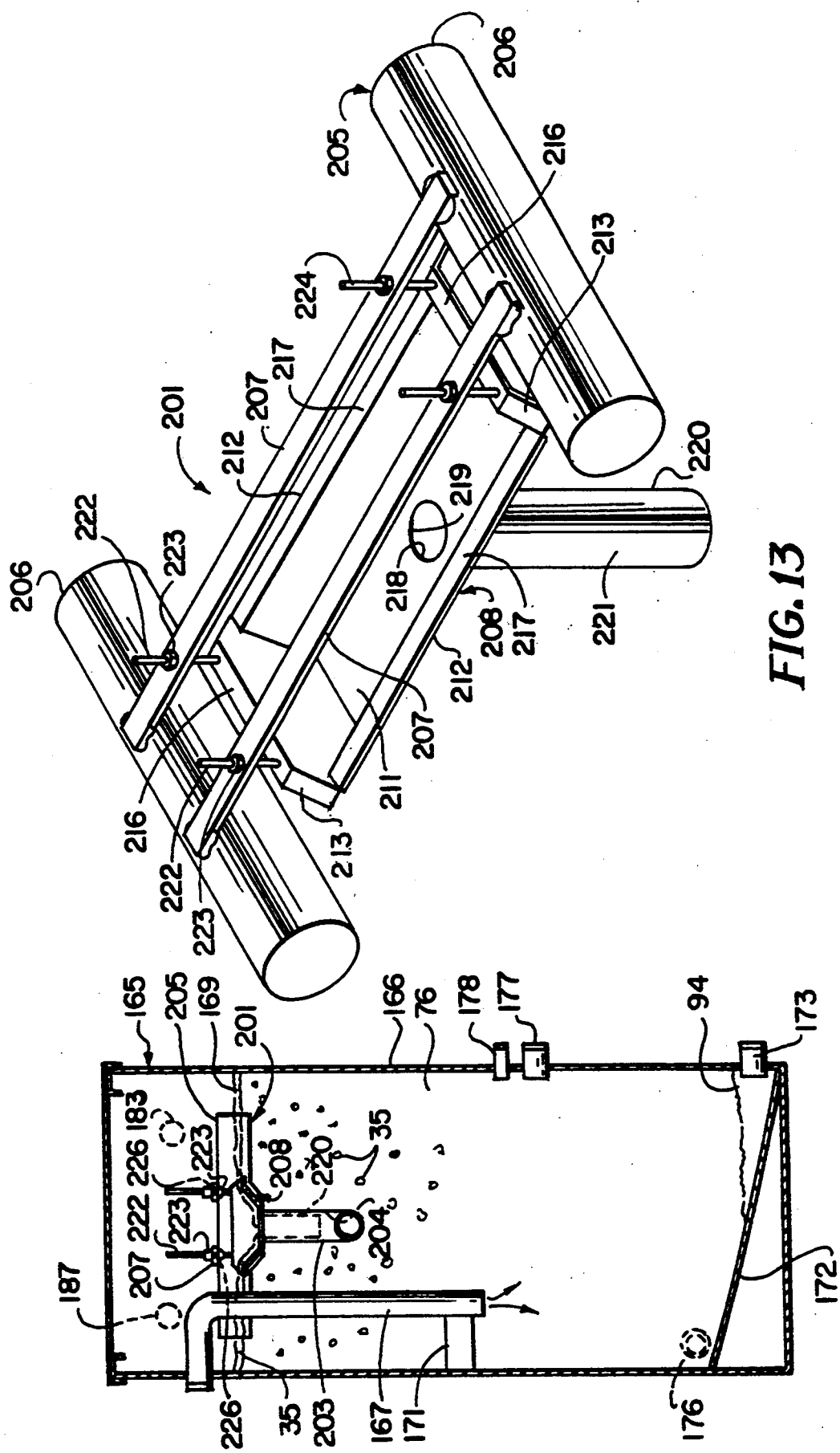

METHOD FOR REMOVING CHEMICAL CONTAMINANTS FROM MATERIAL AND APPARATUS FOR SAME

BRIEF DESCRIPTION OF THE INVENTION

This invention relates to decontamination procedures and apparatus and, more particularly, to procedures and apparatus for removing chemical contaminants from material.

BACKGROUND OF THE INVENTION

Methods and assemblies have been provided for removing chemical contaminants from earth-like material. Some of these methods and assemblies use biological agents or bacteria to dissolve the contaminants. Other methods and assemblies remove the contaminants through thermal procedures such as burning. In general, however, the methods and assemblies which utilize biological agents or thermal procedures have difficulties processing material having a contaminant content above 15,000 parts per million.

Other methods and assemblies use solutions to cleanse the material and remove the contaminants therefrom. However, most of these methods and assemblies are material specific and not capable of washing a variety of materials. In addition, many of these methods and assemblies are not capable of washing materials such as soil or mud in which contaminants can be absorbed. Furthermore, many of these methods and assemblies use petrochemical solvents and other environmentally harmful elements and, as a result, produce harmful and often unpredictable side effects.

OBJECTS AND SUMMARY OF THE INVENTION

It is in general an object of the invention to provide a new and improved procedure and apparatus for removing chemical contaminants from a variety of earth-like materials.

Another object of the invention is to provide a procedure and apparatus of the above character which utilizes an aqueous solution containing a biodegradable emulsifier.

Another object of the invention is to provide a procedure and apparatus of the above character which separates the earth-like material by size so as to remove the larger-size substantially cleansed materials from the cleaning process early on therein.

Another object of the invention is to provide a procedure and apparatus of the above character which separates the earth-like material and chemical contaminants by weight.

Another object of the invention is to provide a procedure and apparatus of the above character which can process up to 50 tons of earth-like material per hour.

Another object of the invention is to provide a procedure and apparatus of the above character which can cleanse earth-like material having a level of chemical contaminants therein in excess of 15,000 parts per million.

Another object of the invention is to provide a procedure and apparatus of the above character which can reduce the level of chemical contaminants in the earth-like material to below 10 parts per million.

These and other objects are achieved in accordance with the invention by providing a method for removing petroleum contaminants from larger-size and smaller-size petroleum-bearing earth-like materials using a movable apparatus. The method includes the steps of loading larger-size and smaller-size petroleum-bearing earth-like materials onto the movable apparatus, screening larger-size petroleum-bearing earth-like material from smaller-size petroleum-bearing earth-like material, spraying larger-size petroleum-bearing earth-like materials with an aqueous cleansing solution having a biodegradable emulsifier therein to remove petroleum contaminants therefrom and to substantially cleanse the larger-size earth-like material and discharging substantially cleansed larger-size earth-like material from the movable apparatus.

The method includes the additional steps of mixing an aqueous cleansing solution having a biodegradable emulsifier therein with smaller-size petroleum-bearing earth-like material to form a slurry, agitating the slurry, washing smaller-size petroleum-bearing earth-like material remaining in the slurry to remove petroleum contaminants therefrom and to substantially cleanse said smaller-size earth-like material, removing substantially cleansed smaller-size earth-like material from aqueous cleansing solution and petroleum contaminants in the slurry, dewatering substantially cleansed smaller-size earth-like material, discharging substantially cleansed smaller-size earth-like material from the movable apparatus, removing petroleum contaminants from aqueous cleansing solution and discharging petroleum contaminants from the movable apparatus.

The movable apparatus of the invention includes a skimmer apparatus for removing petroleum contaminants from the surface of a petroleum and water emulsion disposed in a vessel. The skimmer apparatus includes float means adapted to float on the surface of the emulsion and a member forming a weir having a generally horizontal top weir surface. Securing means is provided for securing the member to the float means so that the member is disposed in the emulsion and petroleum contaminants flow from the surface of the emulsion over the top weir surface into the member. The member has discharge means for discharging therefrom petroleum contaminants skimmed from the surface of the emulsion by the member.

The movable apparatus also includes a separation apparatus for separating petroleum contaminants entrained in a flow of aqueous solution traveling at a velocity. The separation apparatus is formed from a tank having a side wall. An inlet fitting permits the flow of aqueous solution to enter the tank and rise to a surface level. The tank is provided with a labyrinth having a plurality of adjacent substantially vertical columns through which the aqueous solution travels at a reduced velocity to promote the coalescing of the petroleum contaminants into globules of larger mass. The columns have respective top and bottom openings. Centrifugal separation means is provided for reversing the flow of the aqueous solution at the top openings of adjacent columns to promote the separation of the petroleum contaminants from the flow of aqueous solution and includes baffle means. A first outlet fitting at the surface level permits the outflow of petroleum contaminants from the tank and a second outlet fitting below the surface level permits the outflow of the aqueous solution from the tank.

BRIEF DESCRIPTION OF THE DRAWINGS

FIG. 2 is a top plan view of a portion of the apparatus for removing chemical contaminants from material of the present invention as readied for transport.

FIG. 3 is a top plan view of the apparatus shown in FIG. 1 as deployed for operation.

FIG. 4 is a right side elevational view of the apparatus shown in FIG. 3.

FIG. 5 is a left side elevational view of the apparatus shown in FIG. 3.

FIG. 8 is a cross-sectional view taken along the line 8—8 of FIG. 5.

FIG. 9 is a cross-sectional view taken along the line 9—9 of FIG. 8.

FIG. 10 is a cross-sectional view taken along the line 10—10 of FIG. 8.

FIG. 11 is a cross-sectional view taken along the line 11—11 of FIG. 8.

FIG. 12 is a cross-sectional view taken along the line 12—12 of FIG. 2.

FIG. 13 is an isometric view of the skimming apparatus shown in FIG. 12.

DETAILED DESCRIPTION OF THE INVENTION

Figure 1:
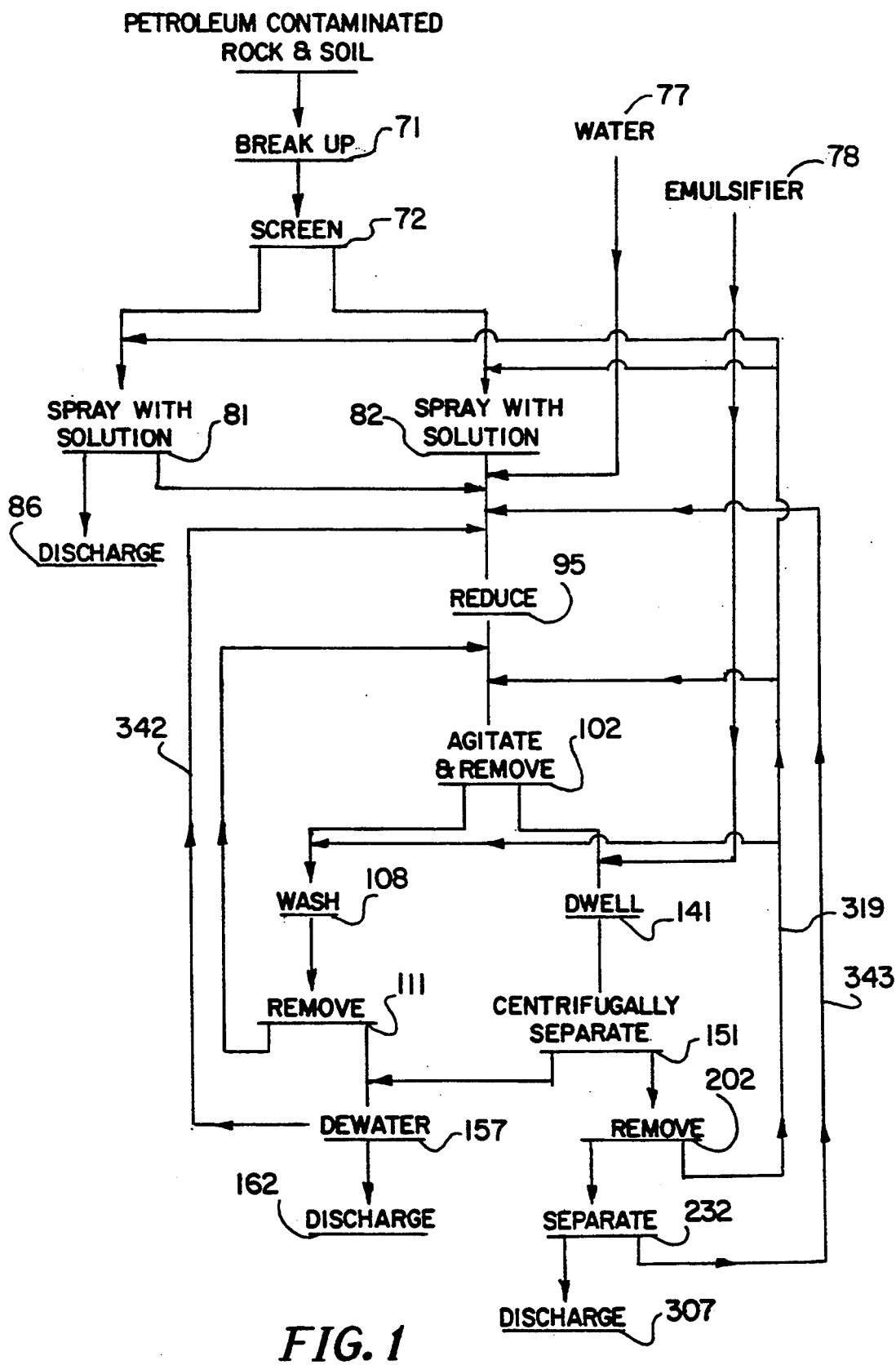
FIG. 1 is a flow chart of the method for removing chemical contaminants from material of the present invention.
Figure 6:
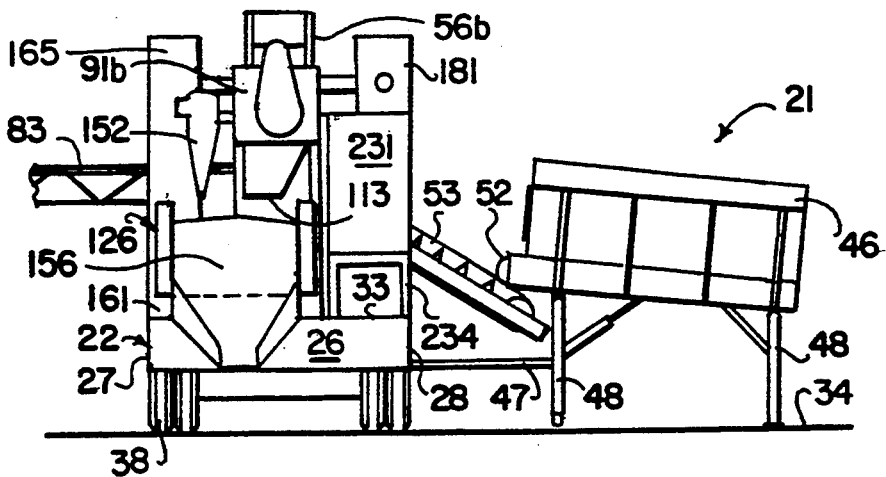
FIG. 6 is a rear elevational view of a portion of the apparatus shown in FIG. 3.

Reference will now be made in detail to the preferred embodiments of the invention, which are illustrated in the accompanying figures. Turning now to the drawings, wherein like components are designated by like reference numerals throughout the various figures, attention is directed to FIGS. 1 through 16.

Movable and portable decontamination apparatus 21 of the present invention includes a wheelable support structure in the form of trailer 22, which can be of any suitable type such as Model #4148 manufactured by Dakota Manufacturing. Trailer 22 is rated for approximately 60,000 pounds and is generally rectangular-shaped when viewed in plan, being approximately 47 feet long and approximately 102 inches wide. The trailer has opposite front and rear ends 23 and 26 and opposite first or left and second or right sides 27 and 28. Trailer 22 is formed with a base or central platform 31 and elevated front and rear platforms 32 and 33 on either end thereof. Decontamination apparatus 21 is shown in its transport mode in FIG. 2 and in its operational mode in FIGS. 3 through 6.

Apparatus 21 can be used on any suitable support surface as the ground 34 for removing petroleum contaminants 35 and other chemical contaminants such as oil, gasoline or other petrochemicals from earth-like materials or substances of both large and small size. The earth-like materials which can be accommodated by apparatus 21 include dirt, soil, rock and/or gravel. Apparatus 21 is self-contained in operation, having an energy supply in the form of a suitable generator 36 such as Model GS-55Q diesel generator manufactured by John Tate, Inc. of Sonoma, Calif. mounted on front platform 32. A control panel 37 is also mounted on front platform 32 for controlling and operating apparatus 21. A wheel assembly 38 is mounted under rear platform 33 and a truck mount 41 mounted under front platform 32 for permitting movement of trailer 22 from one location to another by attachment to a truck or other suitable transport means.

The decontamination method and procedure utilized in apparatus 21 for removing petroleum contaminants 35 from petroleum contaminated or bearing rocks and soil is generally shown in FIG. 1. The petroleum contaminated rocks and soil are loaded into load hopper 46 of apparatus 21 by any suitable means such as a front end loader. Load hopper 46 is slidably mounted on extendable rails 47, transversely attached across the front of central platform 31, and has four retractable legs 48 for supporting it on ground 34. Hopper 46 can have a grizzly screen, not shown in the drawings, mounted across the top thereof for preventing over-sized material from entering the hopper and apparatus 21, and further includes a live bottom conveyor 52 across the central bottom thereof. The petroleum contaminated rocks and soil are moved by live bottom conveyor 52 across the bottom of hopper 46 through an exit port at one end thereof and are deposited onto load conveyor 53 mounted transverse apparatus central platform 31 above extendable rails 47.

Load conveyor 53, which is inclined upwardly as it extends from apparatus right side 28 to apparatus left side 27, deposits the petroleum contaminated rocks and soil onto top screen conveyor 56 mounted generally longitudinally above apparatus central platform 31. Top screen conveyor 56 has a front end 56a coupled to apparatus front platform 32 and an opposite rear end 56b coupled to the top of a vibrating screen assembly 57 supported above apparatus central platform 31 by a separation and wash assembly 58. The petroleum contaminated rocks and soil move rearwardly and upwardly on top screen conveyor 56 for disposition onto the top of vibrating screen assembly 57. Conveyor 56 further includes a tonnage belt scale 61 which measures the tonnage of rocks and soil passing thereon. It should be appreciated that the conveyor means of load conveyor 53 and top screen conveyor 56 can be combined into a single conveyor for transporting the petroleum contaminated rocks and soil from load hopper 46 onto vibrating screen assembly 57 and be within the scope of the present invention.

Decontamination apparatus 21 includes breaking up means and screening means in the form of a forwardly inclined vibrating screen assembly 57 for accomplishing the method steps of breaking up and screening, identified by respective numbers 71 and 72 in FIG. 1, the petroleum contaminated rocks and soil. A suitable screen assembly 57 is manufactured by Kolman, a division of Athey Products Corp. of Sioux Falls, S. Dak., and includes top and bottom spaced apart and generally parallel vibrating screens 73 and 75. The vibration of screens 73 and 75 cause the petroleum contaminated rocks and soil to break up thereon into larger-size and smaller-size rocks and soil. In most operations, coarse top screen 73, often referred to as a scalping screen, is sized to allow rocks and soil ranging in size from three-quarters of an inch to two and one-half inches in cross-sectional size to pass through it. Bottom screen 75, often referred to as the harp deck, is sized to allow rocks and soil ranging in size from one-quarter to three-quarters of an inch in cross-sectional size to pass through it. Bottom screen 75 is stretched onto its vibrating frame so as to be held in tension. As can be appreciated by those skilled in art, this manner of attachment causes the harp deck to vibrate, apart from its frame, when impacted by rocks and soil deposited onto it by top screen 73. The enhanced vibration of bottom screen 75 contributes to the breaking up of the rocks, soil and other loosely composed materials thereon.

As the petroleum contaminated rocks and soil have being broken apart and screened by vibrating assembly 57, they are simultaneously being sprayed with a suitable biodegradable solution 76 which includes proportioned amounts of water 77 and any suitable biodegradable surfactant or emulsifier 78 such as that manufactured by Unique Products, Inc. of San Mateo, Calif. under the name "InProve" Colloidals Oil Spill Cleanup Agent. Solution 76 serves to remove petroleum contaminants 35 from the rocks and soil being processed by the apparatus. In this respect, apparatus 21 includes a plurality of sprayer means or sprayers 79 mounted below top screen conveyor 56 and above scalping screen 73 for accomplishing this method step, identified in FIG. 1 by numbers 81 and 82, of spraying the petroleum contaminated rocks and soil with solution 76. Solution 76 cleanses and drips off non-porous material such as rocks and is absorbed by porous material such as dirt and soil.

Larger-size and oversized rocks cleansed by sprayers 79 and unable to pass through top and bottom screens 73 and 75 vibrate down forwardly inclined screens 73 and 75 and drop off the front thereof onto oversize material conveyor 83 mounted transverse apparatus central platform 31 behind extendable rails 47. Conveyor 83 serves as disposition or discharge means for discharging the larger-size and oversized rocks, substantially cleansed of petroleum contaminants 35 by sprayers 79, from apparatus 21 as shown by method step 86 in FIG. 1. Oversize material conveyor 83 has an end which extends from apparatus left side 27, as illustrated in FIG. 3, for disposing these rocks onto ground 34 or into a dump truck or similar transport vehicle. Vibrating screen assembly 57 and oversize material conveyor 83 can serve to remove a significant portion of the material cleansed by decontamination apparatus 21 early in the process, thereby increasing the efficiency of apparatus 21 and the amount of petroleum contaminated rocks and soil which can be cleansed in a particular time period. Screens 73 and 75 can be sized to so maximize the efficiency of decontamination apparatus 21.

Petroleum-bearing smaller-size earth-like materials which have been sprayed by solution 76 dispensing sprayers 79 and have passed through top and bottom vibrating screens 73 and 75 fall into separation and wash assembly 58, which can be of any suitable type such as that produced by Eagle Iron Works of Des Moines, Iowa. Separation and wash assembly 58 includes a tub or wash basin 91 which serves as a containment means. Basin 91 has a first end portion or containment basin 91a and a second end portion or stem 91b which extends rearwardly and upwardly from containment basin 91a. Soil, smaller rocks, solution 76 and petroleum contaminants 35 from vibrating screen assembly 57 are mixed and collected within the slurry of containment basin 91a, the bottom of vibrating screen assembly 57 having a configuration so that the materials and liquids dropping from screens 73 and 75 are disposed within containment basin 91a.

Separation and wash assembly 58 further includes a screw 92 housed in a trough 93 extending longitudinally along the bottom center of containment basin 91a and stem 91b. Screw 92 performs or assists in performing several of the method steps set forth in FIG. 1. Petroleum-bearing smaller-size rocks and soil deposited in containment basin 91a is initially broken up by the rotation of screw 92 and reduced into, among other things, smaller-size soil material 94 which can include silt, soil particles, small rocks and/or gravel. The breakup or reduction method step performed by screw 92 is identified by number 95 in FIG. 1.

Screw 92 is included within the agitation and separation means of decontamination apparatus 21 and serves to agitate and separate by weight the petroleum contaminants 35, solution 76 and smaller-size soil materials 94 contained in and operated on by separation and wash assembly 58. This agitation and separation means further includes a bottom wash system 96, illustrated in FIGS. 8 and 9, which dispenses solution 76 along one side of the bottom of trough 93 in the forward end of containment basin 91a. Bottom wash system 96 is in the form of a baffle 97 provided with a plurality of spaced apart holes 98 therein and forming one side of trough 93. Pressurized solution 76 is forced out of holes 98 and serves to agitate and separate any soil material 94 which has settled in trough 93. The agitation and removal method step performed by screw 92 and bottom wash system 96, identified by number 102 in FIG. 1, is a non-violent action which contributes to the formation of globules of petroleum contaminants 35.

In agitation and removal step 102, petroleum contaminants 35 which have been separated and removed from the soil and smaller rocks either by sprayers 78, immersion in solution 76 in containment basin 91a and/or the breaking up and agitation by screw 92 and/or bottom wash system 96 and have a specific gravity less than one and rise to the top of the containment basin 91a. Certain soil materials 94, some of which are contaminated with petroleum contaminants 35, also rise to the top of containment basin 91a because of the agitation from screw 92 and/or bottom wash system 96 or because they have a specific gravity less than or close to one and are therefore lighter than solution 76 in containment basin 91a. Containment basin 91a is provided with first level weight separation means in the form of an overflow dam or weir 106 at the forward end thereof over which these petroleum contaminants 35 and soil materials 94 which have risen to the top of containment basin 91a can flow from containment basin 91a into an overflow vessel or tank 107 positioned on apparatus central platform 31. Some solution 76 also flows over weir 106 into overflow tank 107. In this manner, petroleum contaminants 35 and solution 76, with some petroleum contaminated soil material 94 therein, are removed from wash basin 91.

Most of the petroleum contaminated soil material 94 in containment basin 91a having a specific gravity greater than one settles to the bottom of the containment basin where it is moved rearwardly and upwardly through trough 93 by the rotation of screw 92. In so moving this soil material 94 through solution 76 in containment basin 91a and stem 91b, screw 92 further serves as a fine material washer by allowing solution 76 to further act on the soil material 94 and separate additional petroleum contaminants 35 therefrom. This washing method step performed by screw 92 is identified in FIG. 1 by number 108.

Screw 92 also serves as separation or removal means by separating and removing the soil material 94 substantially cleansed in separation and wash assembly 58 from solution 76 and petroleum contaminants 35 therein as it pulls the soil material 94 through trough 93 from containment basin 91a and through stem 91b. This separation or removal method step is identified in FIG. 1 by number 111.

Stem 91b is provided with a top wash dispenser or build-up prevention means in the form of top wash pipe 112 for preventing the buildup of soil material 94 within trough 93 (See FIGS. 8 and 10). Top wash pipe 112 enters trough 93 at the top rear end thereof and dispenses solution 76 down along the side of trough 93 to loosen up any caked or hardened soil material 94 disposed therealong. The small rocks, silt and soil particles carried by screw 92 through stem 91b are dispensed at the rear top end thereof through a discharge hole 113 provided in the bottom thereof onto a dewatering apparatus 126.

Figure 7:
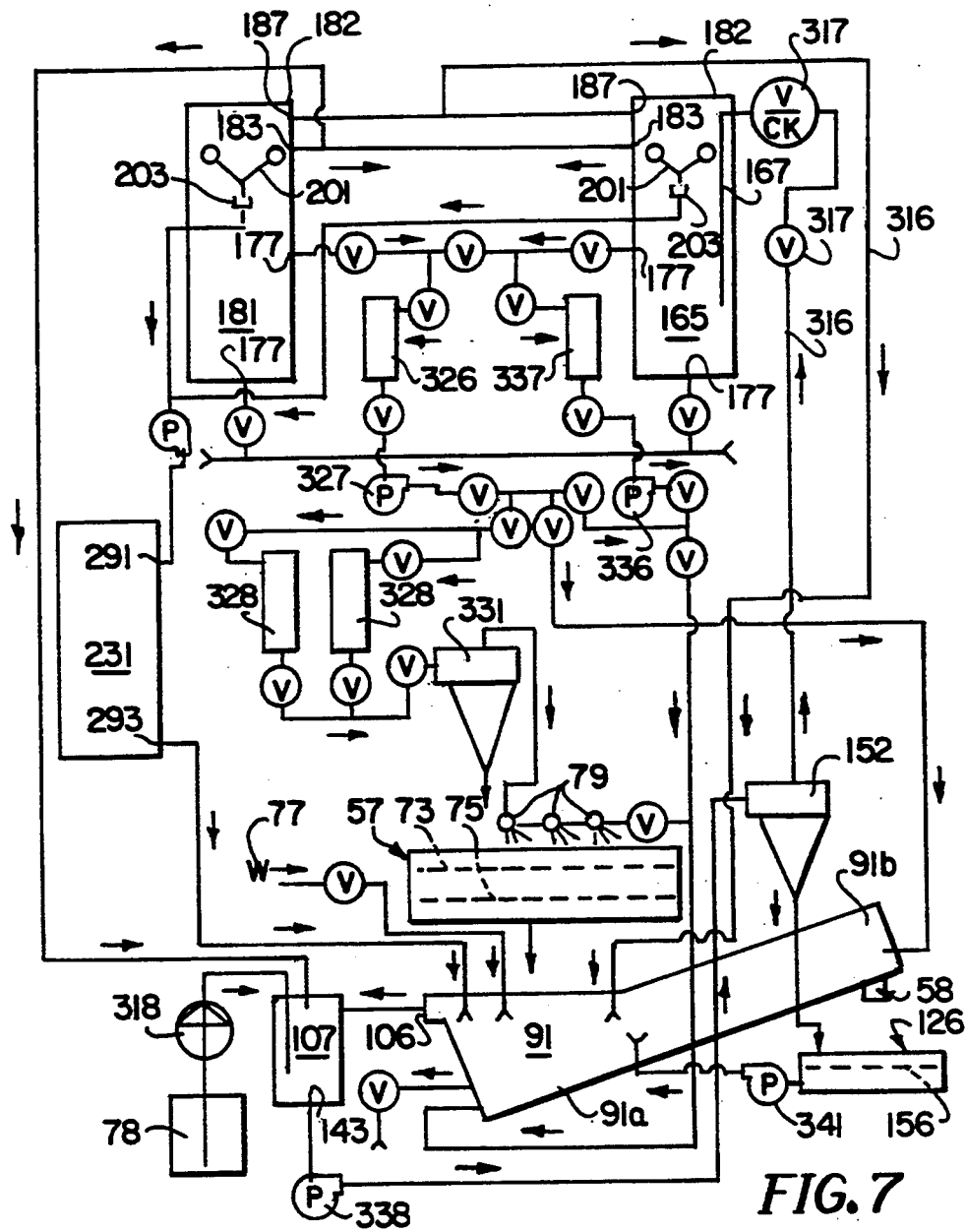
FIG. 7 is a liquid flow diagram of the apparatus shown in FIG. 3.

Overflow tank 107 serves as second containment means and dwell means allowing solution 76 to interact for a period of time with the petroleum contaminated soil material 94 therein to further separate and remove petroleum contaminants 35 therefrom and to substantially cleanse the soil material 94. This dwell step, identified in FIG. 1 by number 141, is enhanced by the relatively high ratio of emulsifier 78 to water 77 in overflow tank 107. As shown in FIG. 7, emulsifier 78 is added to the process of decontamination apparatus 21 at overflow tank 107, causing the emulsifier 78 to water 77 ratio therein to be higher than elsewhere in the process.

Overflow tank 107 is made of any suitable material such as metal and has a capacity ranging from 650 to 850 gallons. Overflow tank 107 has a sloped bottom 142 with a suction outlet fitting 143 at the low end thereof through which the solution 76, petroleum contaminants 35 and substantially cleaned soil material 94 are sucked out of the overflow tank (see FIG. 11). Overflow tank 107 further includes a cleanout inlet fitting 146 near the high end of sloped bottom 142, to permit attachment of a water or other liquid source for cleaning out the overflow tank, and an overflow inlet fitting 147 near the top of overflow tank 107. Oversized material conveyor 83 is supported above apparatus central platform 31 by overflow tank 107.

After dwelling in overflow tank 107, solution 76, petroleum contaminants 35 and the soil material 94 in overflow tank 107 are pumped and centrifugally separated, as shown by method step 151 in FIG. 1, in hydrocyclone 152. As can be appreciated by those skilled in the art, generally cone-shaped hydrocyclone 152 serves as centrifugal separation or second level weight separation means by creating a vortex from the liquid and other materials entering it. The heavier materials to move to the outside of hydrocyclone 152 and fall through the bottom thereof; the lighter materials remain in the center of hydrocyclone 152 and exit from the side thereof. Unlike most hydrocyclones, which are typically used merely for separating water from a material, hydrocyclone 152 separates solution 76 and petroleum contaminants 35 from the soil material 94. Petroleum contaminants 35, having a specific gravity less than one, remain near the center of hydrocyclone 152 and rise to the top thereof where they are discharged with solution 76. The substantially cleansed soil material 94, having a specific gravity less than one, move to the outside of hydrocyclone 152 and are discharged through the bottom thereof onto dewatering apparatus 126.

It should be appreciated that decontamination apparatus 21 can use one or more hydrocyclones, some or all of which are smaller than hydrocyclone 152, and be within the scope of the present invention. As can be appreciated by those skilled in the art, smaller hydrocyclones can remove finer materials than larger hydrocyclones because, for a specified flow rate, greater velocities and correspondingly greater centrifugal forces are created within smaller hydrocyclones.

Dewatering means in the form of dewatering apparatus 126 is mounted adjacent apparatus rear end 26 on apparatus rear platform 33 below hydrocyclone 152 and the discharge hole 113 from separation and wash assembly 58. Dewatering apparatus 126 can be of any suitable type such as a dewatering screen manufactured by Kolman, a division of Athey Products Corp. of Sioux Falls, S. Dak. and has a vibrating screen 156 thereon for performing the dewatering method step, referred to by number 157 in FIG. 1. Screen 156 is sized to allow material ranging in size from 200 to 325 mesh to pass therethrough.

Residual solution 76 and petroleum contaminants 35 are removed from the substantially cleansed soil material 94 deposited from separation and wash assembly 58 and hydrocyclone 152 on dewatering apparatus 126, with the soil material 94 being dropped by the rearwardly inclined vibrating 156 onto rear discharge conveyor 158. Dewatering apparatus 126 further includes a drain tank 161 situated below vibrating screen 156 for collecting the residual solution 76 and petroleum contaminants 35 which have passed through vibrating screen 156. Any soil material 94 which has collected at the bottom of drain tank 161 is periodically removed therefrom by manual means for disposition from decontamination apparatus 21.

Rear discharge conveyor 158 serves as second disposition and discharge means for disposing the substantially cleansed soil material 94 deposited thereon as shown by method step number 162 in FIG. 1. Conveyor 158 is often referred to as a radial stacker and can be pinned or otherwise pivotally attached to apparatus rear end 126. Conveyor 158 deposits the substantially cleansed soil material 94 carried thereby onto ground 34 or into a dump truck or other transport means for carrying them away from decontamination apparatus 21.

Solution 76 and petroleum contaminants 35 from hydrocyclone 152 are carried by a transport pipe to port or left recovery vessel or tank 165 mounted on the front of apparatus rear platform 33 on the left side of wash basin stem 91b. Tank 165 is made of any suitable material such as metal and has a liquid capacity ranging from 400 to 500 gallons. Left recovery tank 165 is generally rectangular in shape when viewed in elevational plan, being formed from four side walls 166 made of any suitable material such as metal.

Solution 76 and petroleum contaminants 35 enter first or left recovery tank 165 through pipe 167 which, as shown in FIG. 12, extends through the rear side wall 166 adjacent hydrocyclone 152 and then bends downwardly such that the solution and petroleum contaminants are discharged toward the bottom of recovery tank 165 or, after startup of apparatus 21, generally below surface 169 of the emulsion of solution 76 and petroleum contaminants 35 contained within the recovery tank. A bracket 171 is mounted to rear side wall 166 recovery tank 165 for retaining the bottom end of pipe 167 in proper position. Left recovery tank 165 has a sloped bottom 172 with a discharge outlet fitting 173 at the low end thereof and a cleanout inlet fitting 176 at the high end thereof for periodically removing any soil material 94 or other sediment which may settle and collect within recovery tank 165. Recovery tank 165 also includes a main outlet fitting 177 for removing solution 76 therefrom and a measuring fitting 178 to permit the attachment of a gauge to recovery tank 165 for measuring the amount and level of solution 76 and petroleum contaminants 35 therein.

Decontamination apparatus 21 includes a second or right recovery vessel or tank 181 mounted on apparatus rear platform 33 on the other side of wash basin stem 91b opposite left recovery tank 165 for further collection and containment of solution 76 and petroleum contaminants 35 discharged by hydrocyclone 152. Starboard or right recovery tank 181 is substantially identical to left recovery tank 165, having four side walls 166 and fittings 173, 176, 177 and 178 but not having inlet pipe 167. Left and right recovery tanks 165 and 181, together, form a recovery means or recovery tank system 182. Tanks 165 and 181 include respective and interconnected overflow line fittings 183 near the top thereof which, among other things, allow solution 76 and petroleum contaminants 35 in tanks 165 and 181 to flow therebetween and act as a single system. Tanks 165 and 181 also include respective vent line fittings 187 elevationally above overflow line fittings 183 which permit overflow from recovery tank system 182 if the capacity thereof has been exceeded.

Recovery tanks 165 and 181 each carry removal or third level weight separation means in the form of an adjustable floating skimmer apparatus 201 for performing the separation or removal step, identified by number 202 in FIG. 1, under which petroleum contaminants 35 are separated and removed from the mixture or emulsion of solution 76 and petroleum contaminants 35 contained in recovery tank system 182. Each floating skimmer 201 is carried within its respective recovery tank 165 or 181 by a drain pipe 203 mounted to and extending outwardly from the inner side wall 166 of the recovery tank and bending upwardly so that the end portion thereof is substantially vertical within respective recovery tank 165 or 181 (See FIG. 12). Each drain pipe 203 has an inner surface 204 which is generally circular in cross-section.

Each floating skimmers 201 is made of any suitable material such as polyvinylchloride plastic and includes a float means or assembly 205 having two spaced-apart, substantially cylindrically-shaped hollow pontoons or floats 206 interconnected at the center thereof by two spaced-apart, substantially parallel strips 207 glued or otherwise suitably mounted at each end to respective floats 206 (See FIG. 13). Each floating skimmer 201 further includes a member forming weir 208 and formed by a longitudinally-extending bottom strip 211, two side strips 212 glued or otherwise suitably mounted longitudinally on two opposite sides of bottom strip 211 and extending upwardly and outwardly therefrom and two spaced-apart, generally parallel end pieces 213 glued or otherwise suitably mounted to the end of strips 211 and 212. End pieces 213 have respective top surfaces 216 which form a plane generally parallel with bottom strip 211 and side strips 212 have respective top weir surfaces 217 which form a plane elevationally below top surfaces 216 and generally parallel with bottom strip 211. Bottom strip 211 is formed with a hole 218 in the center thereof formed by annular inner surface 219 and weir member 208 further includes a stem pipe 220 glued or otherwise suitably mounted to the bottom of bottom strip 211 in alignment with hole 218. Stem pipe 220 has an outer surface 221 which is generally circular in cross-section.

Each floating skimmer 201 has securing means for securing weir member 208 to float assembly 205 which includes four threaded studs 222 and threaded eight nuts 223 having cooperating threads 224. A threaded stud 222 is embedded at each end of each end piece 213 and extends generally perpendicularly upwardly from end top surface 216 so that studs 222 are generally parallel with each other. Each connector strip 207 is provided with spaced-apart and aligned bores 226, one at each end of connector strip 207, which align with threaded studs 222 for cooperatively receiving them. A set of two threaded nuts 223 are disposed on each threaded stud 222, one above and the other below connector strip 207. The elevational position of weir member 208 with respect to float assembly 205 can be adjusted by repositioning the set of nuts 223, and connector strips 207 of the float assembly therebetween, on each threaded stud 222. In this manner, cooperating threads 224 of studs 222 and nuts 223 serve as adjustment means for adjusting the elevational position of weir surface 217 below liquid surface 169 in respective tank 165 or 181.

In operation and use, a float assembly 205 of a floating skimmer 201 floats atop the emulsion of solution 76 and petroleum contaminants 35 in each recovery tank 165 and 181. Stem pipe 220 of each floating skimmer 201 is disposed within respective drain pipe 203, with the stem and drain pipes configured so that a relatively snug seal is formed between outer surface 221 of stem pipe 220 and inner surface 204 of drain pipe 203. Weir member 208 is elevationally positioned with respect to float assembly 205, through adjustment of the set of threaded nuts 223 on threaded studs 222, so that weir surfaces 217 of side strips 212 are below the surface 169 of the emulsion of solution 76 and petroleum contaminants 35. In this manner, the liquids at the top of the recovery tank, petroleum contaminants 35 and some solution 76, flow into weir member 208 and down through stem pipe 220 into drain pipe 203. Hole forming inner surface 219 and stem pipe 220 are included within the discharge means of skimmer 201 for discharging petroleum contaminants 35 from weir member 208 and stem pipe 220 additionally serves as piping means.

Adjustable floating skimmer 201 has proven effective in significantly separating petroleum contaminants 35 from solution 76. The amount of petroleum contaminants 35 and other liquids skimmed from the top of recovery tank system 182 remains substantially constant despite rises and falls of surface 169 within system 182 because the elevational position of weir surfaces 217 with respect to surface 169 remains substantially constant so long as the height of surface 169 remains within the operating range of skimmer 201. In addition, skimmer 201 can be adjusted to maximize the amount of petroleum contaminants 35 skimmed from recovery tank system 182. For example, where petroleum contaminants 35 are relatively light in weight or the ratio of petroleum contaminants 35 to solution 76 in recovery tank system 182 is relatively small, weir member 208 can be adjusted with respect to float assembly 205 so that weir surfaces 217 are relatively close to liquid surface 169. Conversely, where petroleum contaminants 35 are relatively heavy or the ratio of petroleum contaminants 35 to solution 76 is relatively large, weir surfaces 217 can be positioned further below liquid surface 169.

Petroleum contaminants 35 and any solution 76 skimmed by floating skimmers 201 from recovery tank system 182 are further processed in separator 231 mounted on rear platform 33 adjacent apparatus rear end 26 and on the right of dewatering apparatus 126. Separator 231 serves as fourth level weight separation means to accomplish the separation step, identified by number 232 in FIG. 1, under which petroleum contaminants 35 and residual soil material 94 are separated and removed from any solution 76 skimmed from recovery tank system 182. Separator 231 includes a vessel or tank housing 233 made of a suitable material such as steel and having a liquid capacity ranging from 400 to 600 gallons. Tank housing 233, supported on trailer 22 by support structure 234, is generally rectangular when view in plan and has a side wall in the form of opposite and generally parallel first and second planar sides 236 and opposite and generally parallel first and second planar ends 237 and 238. Tank housing 233 further includes a removable top 241, which is generally planar and at right angles to sides 236 and ends 237 and 238, and a plurality of spaced-apart and planar plate members or baffles perpendicularly extending between sides 236 and generally parallel to ends 237 and 238. The baffles are made of any suitable material such as metal and are mounted to sides 236 by any suitable means such as welding.

Figure 14:
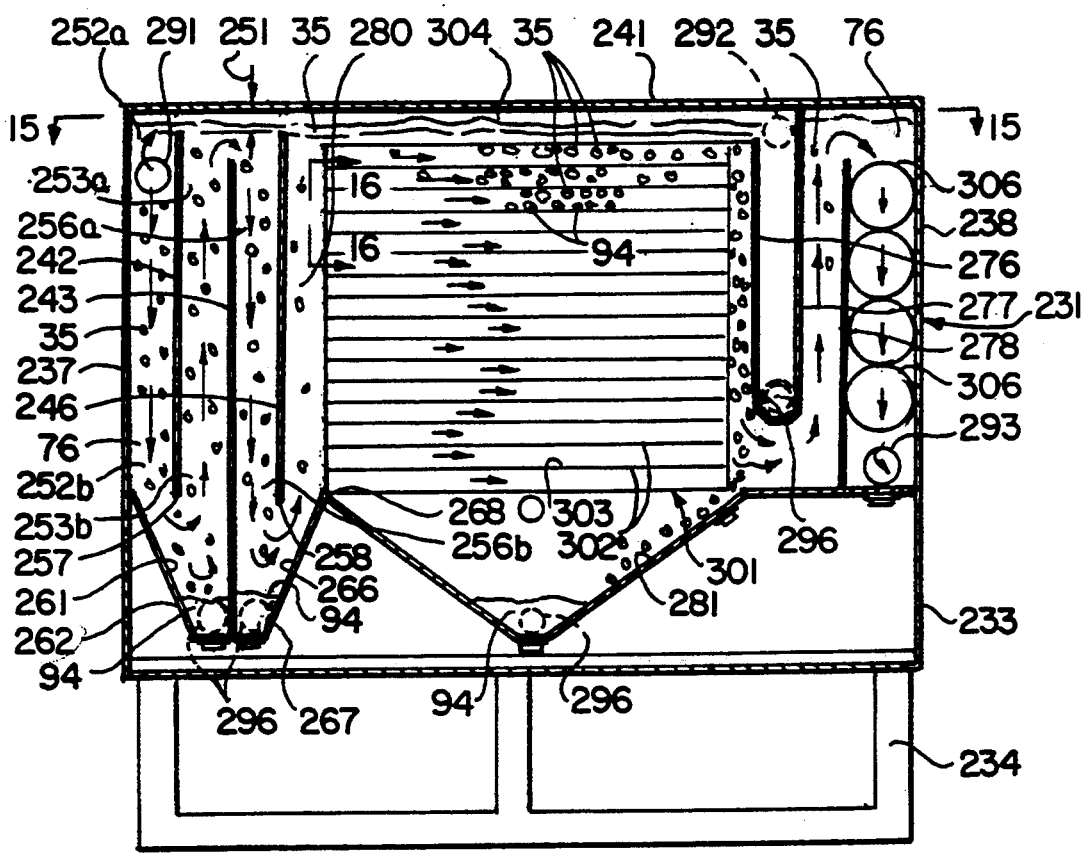
FIG. 14 is a cross-sectional view taken along the line 14—14 of FIG. 3.
Figure 15:
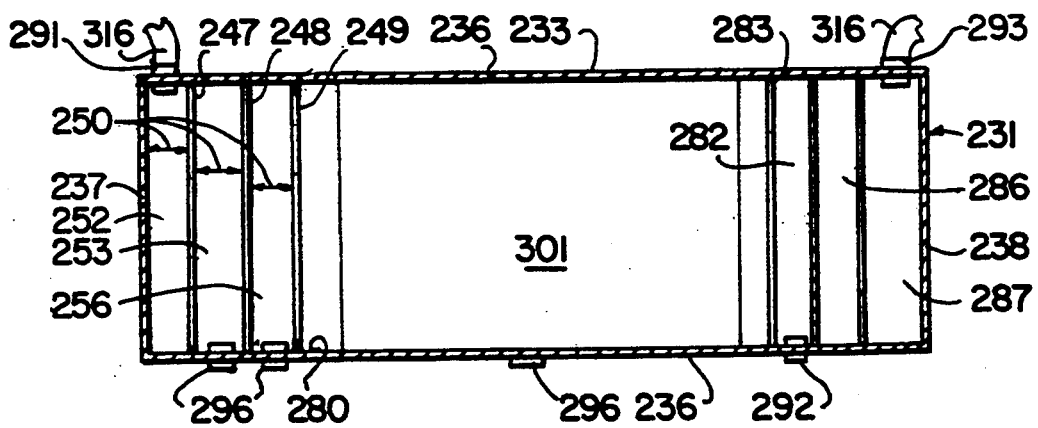
FIG. 15 is a cross-sectional view taken along the line 15—15 of FIG. 14.

As illustrated in FIGS. 14 and 15, first, second and third baffle means or baffles 242, 243 and 246 are spaced sequentially apart from tank first end 237 and have respective top ends 247, 248 and 249. Distance 250 between first end 237 and first baffle 242, first and second baffles 242 and 243 and second and third baffles 243 and 246 is approximately equal, and the space therebetween forms a labyrinth having substantially vertical respective first, second and third columns 252, 253 and 256. Top ends 247 and 249 are spaced approximately the same distance 251 below tank top 241 and top end 248 is approximately twice distance 251 below tank top 241. First and third baffles 242 and 246 have bottom ends 257 and 258 which are spaced above the bottom of tank housing 233. Adjacent first, second and third columns 252, 253 and 256 have opposite respective top and bottom openings 252a and 252b, 253a and 253b and 256a and 256b.

Bottom openings 252b and 253b of first and second columns 252 and 253 open into first collection cavity or chamber 261 having a bottom surface formed by floor plate 262 extending from tank first end 237 downwardly to the bottom end of second baffle 243. Bottom opening 256b of third column 256 opens into a second collection cavity or chamber 266 which has a bottom surface formed by a floor plate 267 extending generally upwardly from the bottom of second baffle 243. Floor plate 267 has a top end 268 which is slightly above third baffle bottom end 258 and is spaced horizontally apart therefrom a distance substantially equal to the distance between second and third baffles 243 and 246.

Fourth, fifth and sixth baffles 276, 277 and 278 are spaced sequentially apart from third baffle 246 and are substantially adjacent tank second end 238. The space between third and fourth baffles 246 and 276 forms central area 280 of separator 231 and has a third collection cavity or chamber 281 at the bottom thereof. Fourth and fifth baffles 276 and 277 are interconnected at the bottoms thereof to form standing column 282 therebetween. Fourth baffle 276 has a top end 283 which is spaced below tank top 241 a distance 251, being approximately the same elevational level as first baffle top end 247 and third baffle top end 249. Sixth baffle 278 is spaced-apart from tank second end 238 and fifth baffle 277 is spaced-apart from sixth baffle 278 a substantially equal distance 251 to create respective fourth and fifth columns 286 and 287.

Various fittings are formed in tank housing 233 to permit the inflow and outflow of petroleum contaminants 35, solution 76 and any particulates or other material carried thereby. An inlet fitting 291 is formed near the top of first column 252 below first top end 247, a first or contaminant outlet fitting 292 is provided atop standing column 282 slightly below fourth baffle top end 283 and a second or solution outlet fitting 293 is provided at the bottom of fifth column 287. Sediment discharge fittings 296 are provided at the bottom of each of first, second and third collection chambers 261, 266 and 281 and at the bottom of standing column 282.

Figure 16:
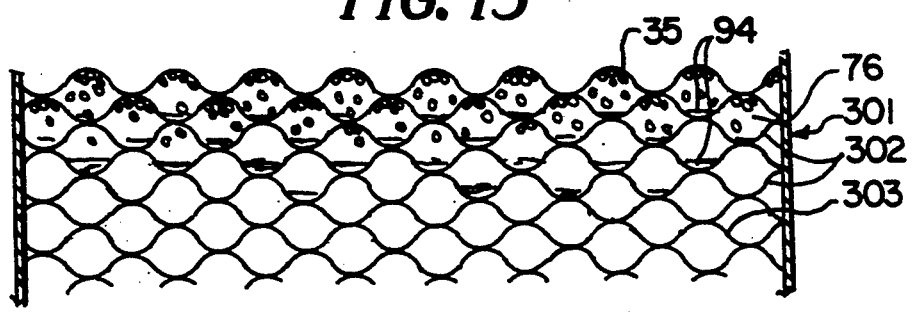
FIG. 16 is a cross-sectional view taken along the line 16—16 of FIG. 14.

Coalescing means in the form of coalescing filter array 301 is mounted to tank housing 233 in central area 280 between third and fourth baffles 246 and 276. As illustrated in FIGS. 14 and 16, coalescing filter 301 can be of a conventional type formed from a plurality of substantially horizontal scalloped elevation dividers 302 disposed across central area 280 and interconnected to form a plurality of aligned coalescing chambers 303 therebetween. It should be appreciated that coalescing filter 301 can have various other configurations and be within the scope of the present invention.

During operation of decontamination apparatus 21, a flow of solution 76 with entrained petroleum contaminants 35 and residual amounts of soil material 94 therein enter separator 231 through inlet fitting 291 in a flow having a certain velocity. Once inside separator 231, the velocity of the flow decreases such that the lighter liquids, particularly the larger globules or droplets of petroleum contaminants 35, rise toward surface 304 where they float over first baffle top end 247 and continue over third baffle top end 249, coalescing filter array 301 and fourth baffle top end 283. Petroleum contaminants 35 collect in standing column 282 until they rise to the level of contaminant outflow fitting 292 and flow out of separator 231. Any heavier liquids or materials which also pass over fourth baffle top end 283 settle to the bottom of standing column 282.

The conformation of separator 231 enhances the formation of larger globules or droplets of petroleum contaminants 35 and the separation thereof from solution 76. More specifically, the emulsion of liquids and materials entering separator 231 which have not flowed over first baffle top end 247, including the smaller globules and molecules of the petroleum contaminants 35, proceed down first column 252, up second column 253 and down third column 256. The reduction in velocity of the flow in first, second and third columns 252, 253 and 256, as shown in FIG. 15 by the substantial flow area thereof, allows time for petroleum contaminants 35 to come together and coalesce into globules of larger mass. In this manner, first, second and third baffles 242, 243 and 246 are included in the dwell and globule formation means of separator 231.

First, second and third baffles 242, 243 and 246 and floor plates 262 and 267 are also included in the flow reversal separation means of separator 231. The reverse in liquid flow in first collection chamber 261 at bottom openings 252b and 253b of first and second columns 252 and 253 and in second collection chamber 266 at bottom opening 256b of third column 256 tends to create centrifugal forces and eddies which cause relatively heavy soil material 94 entrained in the emulsion flow to separate therefrom and settle to the bottom of the collection chambers. In this manner, floor plate 262 is included in the centrifugal separation means at bottom openings 252b and 253b to promote the separation of soil material 94 having a specific gravity greater than one from the flow of solution 76. The reverse in liquid flow at top openings 253a and 256a of second and third columns 253 and 256 also creates centrifugal forces and eddies which urge petroleum contaminants 35 entrained in the emulsion flow to rise to surface 304 and flow over third and fourth baffle top ends 249 and 283 to outlet fitting 292. In this manner, the top portions of first and third baffles 242 and 246 are included in the centrifugal separation means at top openings 253a and 256a to promote the separation of petroleum contaminants 35 from the flow of solution 76.

Elevation dividers 302 of coalescing filter array 301, and coalescing chambers 303 formed thereby, serve to enhance the coalescing of petroleum contaminants 35 in the emulsion flow passing through coalescing filter array 301. As can be appreciated by those skilled in the art and as shown in FIGS. 14 and 16 (where, for simplicity, only some petroleum contaminants 35 and soil material 94 are illustrated), elevation dividers 302 provide a plurality of surfaces in separator central area 280 upon which petroleum contaminants 35 can gather and form into globules or droplets of larger mass while traveling through coalescing filter array 301. Upon exiting the end of coalescing filter array 301, these globules of petroleum contaminants 35 rise to liquid surface 304 where they flow over fourth baffle top end 283 and out contaminant outlet fitting 292. Any soil material 94 or particles which have collected in coalescing filter array 301 settles into third collection chamber 281 after exiting the array.

Solution 76 exiting coalescing filter array 301, and any residual petroleum contaminants 35 entrained therein, flow under the bottom of fourth and fifth baffles 276 and 277, up fourth column 286 and down fifth column 287. A plurality of absorbent means in the form of polishing or final filters 306 are disposed in fifth column 287 for removing any such residual petroleum contaminants 35 from solution 76 passing therethrough. Filters 306 are accessible from removable separator top 241. After passing through filters 306, solution 76 is discharged from separator 231 through solution outlet fitting 293.

Petroleum contaminants 35 discharged from separator 231 are removed or discharged from decontamination apparatus 21 for disposal, as shown by disposal or discharge method step number 307 in FIG. 1, in barrels or other suitable containment vessels. Any soil material 94, particles and/or other sediment which has collected in collection chambers 261, 266 and 281 and at the bottom of standing column 282 can be drained from separator 231 through sediment discharge fittings 296.

The flow of liquid in decontamination apparatus 21 is shown generally in the flow chart of FIG. 1. As shown in more detail in FIG. 7, piping means and valve means in the form of pipes 316 and valves 317 are included within apparatus 21 for directing the flow of liquid therein. Pipes 316, valves 317 and the various pumps and other apparatus shown in FIG. 7 are generally not included in the other drawings for simplicity. Water 77 is preferably introduced into the liquid flow of apparatus 21 by pumping it into containment basin 91a of separation and wash assembly 58. Pumping means in the form of metering or proportioning pump 318 is provided for introducing emulsifier 78 in proper proportions into overflow tank 107. It has been found that the ratio of emulsifier 78 to water 77 can range from 1:20 to 1:50.

Solution 76 for sprayers 78 is provided by recovery tank system 182 as shown by feedback line 319 in FIG. 1. Pipes 316 interconnect main outlet fittings 177 of left and right recovery tanks 165 and 181 of recovery tank system 182 so that solution 76 can be provided from either tank. Valves 317 direct the flow of solution 76 from recovery tank system 181 through strainer 326. Pumping means in the form of spray curtain pump 327 provides the necessary pressure to drive solution 76, and residual petroleum contaminants 35 not skimmed from system 182 by skimmers 201, through additional strainers 328 and hydrocyclone 331 before discharging it through sprayers 79 over vibrating screen assembly 57. Strainers 326 and 328 serve to remove any soil material 94 and/or trash from the flow of solution 76. The strainers are particularly useful for removing material having a specific gravity less than one, such as wood chips, from the flow of solution 76. Such materials, because of their relatively light weight, are not easily separated from the liquid flow by the various hydrocyclones in decontamination apparatus 21. Hydrocyclone 331 is substantially similar to hydrocyclone 115 and serves to remove heavier soil material 94 from the flow of solution 76 and discharge them onto vibrating screen assembly 57. Solution 76 from recovery tank system 182 may have some petroleum contaminants 35 entrained therein.

Solution 76 for bottom wash system 96 and top wash pipe 112 are also provided by recovery tank system 182 as shown by feedback line 319 in FIG. 1. Pumping means in the form of bottom wash pump 336 serves to pump solution 76, and residual petroleum contaminants 35 in system 182, from main outlet fittings 177 of recovery tank system 182 through strainer 337 and into bottom wash system 96. Solution for top wash pipe 112 is pumped from recovery tank system 182 by spray curtain pump 327. Valves 317 also permit solution to be pumped by spray curtain pump 327 to bottom wash system 96.

Decontamination apparatus 21 further includes pumping means in the form of chopper pump 338 for pumping petroleum contaminants 35, solution 76 and other liquids and material from overflow tank 107 to hydrocyclone 152. Chopper pump 338 further serves as chopping means to break up certain relatively light materials which have floated over weir 106 into overflow tank 107, such as wood or bark, so that these materials do not clog the liquid flow of apparatus 21 and can be removed therefrom by strainers 326, 328 and 337.

Pumping means in the form of stripper pump 341 is provided for pumping residual solution 76 and petroleum contaminants 35 collected during dewatering step 157 from drain tank 161 of dewatering apparatus 126 and atmospherically dumping them into containment basin 91a, as shown by feedback line 342 in FIG. 1. Solution 76 discharged from separator 231 through solution outlet fitting 293 is transported by pipes 316 to wash basin 91 where it is also atmospherically dumped into containment basin 91a, as shown by feedback line 343 in FIG. 1.

Pipes 316 further serve to interconnect overflow line fittings 183 of left and right recovery tanks 165 and 181 and vent them into overflow tank 107. If floating skimmers 201 are incapable of handling the amount of liquid flowing into any one of recovery tanks 165 or 181 of recovery tank system 182, liquid surface 169 within that tank rises above overflow line fitting 183 to vent liquid from that recovery tank to the other recovery tank. If surface 169 within the other recovery tank also rises above its overflow line fitting 183, liquid flowing into overflow line fittings 183 from recovery tank system 182 is then vented to and atmospherically dumped within overflow tank 107 for recycling through the process of decontamination apparatus 21.

Pipes 316 also serve to interconnect vent line fittings 187 of left and right recovery tanks 165 and 181 and drain any liquid flowing therein into wash basin 91. If floating skimmers 201 and overflow line fittings 183, together, are unable to handle the amount of liquid flowing into recovery tank system 182 and liquid surface 169 therein rises to the level of vent line fittings 187, liquid is drained from the recovery tank system and atmospherically dumped into separation and wash assembly 58 for recycling through the process of decontamination apparatus 21.

Decontamination apparatus 21 is illustrated in transport mode in FIG. 2. To ready apparatus 21 for transport, extendable rails 47 are retracted onto the front of apparatus central platform 31 and load hopper 46 slid back thereon so that it is generally centered between left and right sides 27 and 28 of central platform 31. Oversize material conveyor 83 and rear discharge conveyor 158 are removed from their respective operational positions and either secured to apparatus 21 for transport, in a manner not shown in FIG. 2, or transported separate and apart from apparatus 21.

It should be appreciated that load hopper 46 can be otherwise carried by or associated with trailer 22 and be within the scope of the present invention. Furthermore, decontamination apparatus 21 can be fitted with booms and/or cranes for deploying the conveyors thereof and/or load hopper 46 and be within the scope of the present invention.

It is apparent from the foregoing that a new and improved procedure and apparatus has been provided for removing chemical contaminants from a variety of earth-like materials. The procedure and apparatus utilizes an aqueous solution containing a biodegradable emulsifier and separates the earth-like material by size so as to remove the larger-size substantially cleansed materials from the cleaning process early on therein. The procedure and apparatus also separates the earth-like material and chemical contaminants by weight. It can process up to 50 tons of earth-like material per hour. The procedure and apparatus can cleanse earth-like material having a level of chemical contaminants therein in excess of 15,000 parts per million and can reduce the level of the contaminants therein to below 10 parts per million.

The foregoing descriptions of specific embodiments of the present invention have been presented for purposes of illustration and description. They are not intended to be exhaustive or to limit the invention to the precise forms disclosed, as many modifications and variations are possible in light of the above teaching. The embodiments were chosen and described in order to best explain the principles of the invention and its practical application, and to thereby enable others skilled in the art to best utilize the invention and various embodiments with various modifications as are suited to the particular use contemplated. It is intended that the scope of the invention be defined by the claims appended hereto and their equivalents.

What is claimed is:

1. A continuous method for removing petroleum contaminants from larger-size and smaller-size petroleum-bearing earthen material using a movable apparatus comprising the steps of loading larger-size and smaller-size petroleum-bearing earthen material onto the movable apparatus, screening larger-size petroleum-bearing earthen material from smaller-size petroleum-bearing earthen material, spraying larger-size petroleum-bearing earthen material with an aqueous cleansing solution having a biodegradable emulsifier therein to remove petroleum contaminants therefrom and create substantially cleansed larger-size earthen material, discharging substantially cleansed larger-size earthen material from the movable apparatus, introducing the smaller-size petroleum-bearing earthen material into an aqueous cleansing solution having a biodegradable emulsifier therein to form a slurry having heavier and lighter smaller-size petroleum-bearing earthen material therein, gently agitating the slurry to separate petroleum contaminants from lighter smaller-size petroleum-bearing earthen material and create substantially cleansed lighter smaller-size earthen material, washing heavier smaller-size petroleum-bearing earthen material to remove petroleum contaminants therefrom and create substantially cleansed heavier smaller-size earthen material, removing substantially cleansed heavier and lighter smaller-size earthen material from the slurry, dewatering substantially cleansed heavier and lighter smaller-size earthen material, discharging substantially cleansed heavier and lighter smaller-size earthen material from the movable apparatus, removing petroleum contaminants from aqueous cleansing solution and discharging petroleum contaminants from the movable apparatus.

2. A method as in claim 1 together with the steps of removing petroleum contaminants and aqueous cleansing solution from the slurry, the petroleum contaminants and aqueous cleansing solution removed from the slurry having some lighter smaller-size petroleum-bearing earthen material therein, allowing said lighter smaller-size petroleum-bearing earthen material to dwell with the aqueous cleansing solution so as to permit the aqueous cleansing solution to remove petroleum contaminants therefrom and create substantially cleansed lighter smaller-size earthen material and centrifugally separating said substantially cleansed lighter smaller-size earthen material from petroleum contaminants and aqueous cleansing solution.

3. A continuous method for removing petroleum contaminants from heavier and lighter petroleum-bearing earthen material using a movable apparatus comprising the steps of loading heavier and lighter petroleum-bearing earthen material onto the movable apparatus, introducing the heavier and lighter petroleum-bearing earthen material into an aqueous cleansing solution having a biodegradable emulsifier therein to form a slurry, gently agitating the slurry to separate petroleum contaminants from lighter petroleum-bearing earthen material, removing petroleum contaminants and aqueous cleansing solution from the slurry, the petroleum contaminants and aqueous cleansing solution removed from the slurry having some lighter petroleum-bearing earthen material therein, allowing said lighter petroleum-bearing earthen material to dwell with the aqueous cleansing solution so as to permit the aqueous cleansing solution to remove petroleum contaminants therefrom and create substantially cleansed lighter earthen material, centrifugally separating said substantially cleansed lighter earthen material from petroleum contaminants and aqueous cleansing solution, washing heavier petroleum-bearing earthen material in the slurry to remove petroleum contaminants therefrom and create substantially cleansed heavier earthen material, removing substantially cleansed heavier earthen material from aqueous cleansing solution and petroleum contaminants in the slurry, dewatering substantially cleansed heavier and lighter earthen material, discharging substantially cleansed heavier and lighter earthen material from the movable apparatus, removing petroleum contaminants from aqueous cleansing solution and discharging petroleum contaminants from the movable apparatus.

4. A method as in claim 3 wherein said introducing step includes raining the heavier and lighter petroleum-bearing earthen material into the slurry.

5. A method as in claim 3 wherein said gently agitating step includes introducing aqueous cleansing solution into the bottom of the slurry in a manner which calmly agitates the slurry.

6. A movable apparatus for decontaminating heavier and lighter petroleum-bearing earthen material in a continuous process comprising a movable support structure, containment means carried by the movable support structure for receiving heavier and lighter petroleum-bearing earthen material and mixing said material with an aqueous cleansing solution having a biodegradable emulsifier therein to form a slurry, the containment means having gentle agitation means for separating petroleum contaminants from lighter petroleum-bearing earthen material therein and a weir for removing petroleum contaminants and aqueous cleansing solution from the containment means, the petroleum contaminants and aqueous cleansing solution removed by the weir having some lighter petroleum-bearing earthen material therein, dwell means carried by the movable support structure for receiving lighter petroleum-bearing earthen material from the weir and permitting the lighter petroleum-bearing earthen material to be cleansed by the aqueous cleansing solution into substantially cleansed lighter earthen material, centrifugal separation means carried by the movable support structure for separating substantially cleansed lighter earthen material from petroleum contaminants and aqueous cleansing solution received from the dwell means, the containment means having a screw for removing petroleum contaminants from the heavier petroleum-bearing earthen material to create substantially cleansed heavier earthen material and for removing substantially cleansed heavier earthen material from the containment means, dewatering means carried by the movable support structure for dewatering substantially cleansed heavier earthen material received from the containment means and substantially cleansed lighter earthen material received from the centrifugal separation means, discharge means carried by the movable support structure for receiving earthen material from the dewatering means and discharging it from the movable apparatus and petroleum separation means carried by the movable support structure for removing petroleum contaminants from aqueous cleansing solution.

7. A movable apparatus as in claim 6 wherein said gentle agitation means includes means for injecting aqueous cleansing solution across the bottom of the containment means in a manner which calmly agitates the slurry.

8. A movable apparatus as in claim 7 wherein said centrifugal separation means includes a hydrocyclone.

9. A movable apparatus for decontaminating petroleum-bearing earthen material in a continuous process comprising a wheelable support structure, screening means carried by the wheelable support structure for breaking up the petroleum-bearing earthen material into larger-size and smaller-size petroleum-bearing earthen material and screening larger-size petroleum-bearing earthen material from smaller-size petroleum-bearing earthen material, spray means carried by the wheelable support structure for spraying the larger-size petroleum-bearing earthen material with an aqueous cleansing solution having a biodegradable emulsifier therein to remove petroleum contaminants therefrom and create substantially cleansed larger-size earthen material, first discharge means carried by the wheelable support structure for receiving substantially cleansed larger-size earthen material from the screening means and discharging it from the movable apparatus, first containment means carried by the wheelable support structure for receiving smaller-size petroleum-bearing earthen material from the screening means and mixing said material with an aqueous cleansing solution having a biodegradable emulsifier therein to form a slurry having heavier and lighter smaller-size petroleum-bearing earthen material therein, the first containment means having a screw for washing the heavier smaller-size petroleum-bearing earthen material in the slurry to remove petroleum contaminants therefrom and create substantially cleansed heavier smaller-size earthen material and for removing substantially cleansed heavier smaller-size earthen material from the slurry within the first containment means, the first containment means having gentle agitation means for separating petroleum contaminants from lighter smaller-size petroleum-bearing earthen material therein and a weir for removing petroleum contaminants and aqueous cleansing solution from the slurry, the petroleum contaminants and aqueous cleansing solution removed from the slurry by the weir having some lighter smaller-size petroleum-bearing earthen material therein, a second containment means carried by the wheelable support structure for receiving the lighter smaller-size petroleum-bearing earthen material from the weir and allowing it to dwell with the aqueous cleansing solution received from the weir so as to permit the aqueous cleansing solution to remove petroleum contaminants from the lighter smaller-size petroleum-bearing earthen material and create substantially cleansed lighter smaller-size earthen material, a hydrocyclone carried by the wheelable support structure for separating substantially cleansed lighter smaller-size earthen material from petroleum contaminants and aqueous cleansing solution received from the second containment means, dewatering means carried by the wheelable support structure for dewatering substantially cleansed heavier smaller-size earthen material received from the first containment means and substantially cleansed lighter smaller-size earthen material received from the hydrocyclone, second discharge means carried by the wheelable support structure for receiving heavier and lighter smaller-size earthen material from the dewatering means and discharging it from the movable apparatus and a separator carried by the wheelable support structure for separating petroleum contaminants from aqueous cleansing solution received from the hydrocyclone.

10. A floating skimmer apparatus for use in a decontamination apparatus to remove petroleum contaminants from the surface of a petroleum and water emulsion disposed in a vessel comprising float means adapted to float on the surface of the emulsion, a member forming a weir provided with a circumferentially-extending wall forming a recess, at least a portion of the circumferentially-extending wall having a generally horizontal top weir surface, and securing means securing the member forming a weir to the float means so that the member forming a weir floats in the emulsion and petroleum contaminants flow from the surface of the emulsion over the top weir surface into the recess of the member forming a weir, the member forming a weir having discharge means for discharging therefrom petroleum contaminants skimmed from the surface of the emulsion by the member forming a weir.

11. A floating skimmer apparatus as in claim 10 wherein said securing means includes adjustment means for adjusting the elevational position of said top weir surface below the surface of said emulsion.

12. A floating skimmer apparatus as in claim 10 wherein said discharge means has piping means carried by said member forming a weir.

13. A floating skimmer apparatus as in claim 10 wherein said circumferentially-extending wall includes opposite first and second wall portions having respective first and second generally horizontal top weir surfaces.

14. A separation apparatus for use in a decontamination apparatus to separate petroleum contaminants and fine particles of earthen material having a specific gravity greater than one entrained in a flow of aqueous solution traveling at a velocity comprising a tank having a side wall and a bottom, an inlet fitting provided in the tank to permit the flow of aqueous solution to enter the tank and rise to a surface level, the tank provided with a plurality of substantially vertical spaced-apart baffle means having respective opposite top and bottom end portions, the baffle means forming a plurality of columns through which the aqueous solution travels, the columns having a cross-sectional area which causes the aqueous solution to travel at a reduced velocity so as to promote the coalescing of the petroleum contaminants into globules of larger mass and having respective top and bottom openings, the top end portion of at least one of the baffle means being spaced below the surface level and included within means for reversing the flow of the aqueous solution at the top openings of the adjacent columns to promote the separation of the petroleum contaminants from the flow of aqueous solution, a first outlet fitting provided in the tank at the surface level to permit the outflow of petroleum contaminants from the tank, the bottom end portion of an adjacent baffle means being spaced from the bottom of the tank and included within means for reversing the flow of the aqueous solution at the bottom openings of adjacent columns to promote the separation of the fine particles of earthen material from the flow of aqueous solution, a second outlet fitting provided in the tank at said bottom openings of adjacent columns to permit the removal of the fine particles of earthen material from the tank, and a third outlet fitting provided in the tank below the surface level to permit the outflow of the aqueous solution from the tank.

15. A separation apparatus for use in a decontamination apparatus to separate petroleum contaminants and fine particles of earthen material having a specific gravity greater than one entrained in a flow of aqueous solution traveling at a velocity comprising a tank having a side wall and a bottom, an inlet fitting provided in the tank to permit the flow of aqueous solution to enter the tank and rise to a surface level, the tank provided with a plurality of substantially vertical spaced-apart baffle means having respective opposite top and bottom end portions, the baffle means forming a plurality of columns with respective top and bottom openings through which the aqueous solution travels at a reduced velocity so as to promote the coalescing of the petroleum contaminants into globules of larger mass, the top end portion of at least one of the baffle means being spaced below the surface level and included within means for reversing the flow of the aqueous solution at the top openings of the adjacent columns to promote the separation of the petroleum contaminants from the flow of aqueous solution, a first outlet fitting provided in the tank at the surface level to permit the outflow of petroleum contaminants from the tank, the bottom end portion of an adjacent baffle means being spaced from the bottom of the tank and included within means for reversing the flow of the aqueous solution at the bottom openings of adjacent columns to promote the separation of the fine particles of earthen material from the flow of aqueous solution, a plurality of spaced-apart horizontally extending members carried by the tank forming a plurality of vertically and horizontally spaced-apart chambers through which the aqueous solution flows to promote the coalescing of the petroleum contaminants into globules of larger mass and a second outlet fitting provided in the tank below the surface level to permit the outflow of the aqueous solution from the tank.

* * * * *